United States Patent
Gaudig et al.

(10) Patent No.: US 9,499,086 B2
(45) Date of Patent: Nov. 22, 2016

(54) MOTOR VEHICLE WITH AN ADJUSTABLE LOADING PANEL IN A CARGO SPACE

(71) Applicant: GM GLOBAL TECHNOLOGY OPERATIONS LLC, Detroit, MI (US)

(72) Inventors: Ralf Gaudig, Ruesselsheim (DE); Werner Berhard, Nauheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 303 days.

(21) Appl. No.: 13/779,276

(22) Filed: Feb. 27, 2013

(65) Prior Publication Data

US 2013/0343846 A1 Dec. 26, 2013

(30) Foreign Application Priority Data

Jun. 22, 2012 (DE) .................. 10 2012 012 359

(51) Int. Cl.
- *B60P 1/00* (2006.01)
- *B60P 1/64* (2006.01)
- *B60R 5/04* (2006.01)

(52) U.S. Cl.
CPC ... *B60P 1/64* (2013.01); *B60R 5/04* (2013.01)

(58) Field of Classification Search
CPC ........................................ B60P 1/00
USPC ........................................ 414/522
See application file for complete search history.

(56) References Cited

U.S. PATENT DOCUMENTS

| | | |
|---|---|---|
| 5,667,120 A | 9/1997 | Bieck et al. |
| 2002/0180231 A1* | 12/2002 | Fox ............... 296/26.01 |
| 2006/0290157 A1 | 12/2006 | Bohlke et al. |
| 2010/0283279 A1 | 11/2010 | Suzuki et al. |

FOREIGN PATENT DOCUMENTS

| | | |
|---|---|---|
| DE | 10236102 A1 | 2/2004 |
| DE | 10241687 A1 | 3/2004 |
| DE | 10261393 A1 | 7/2004 |
| DE | 202006018471 U1 | 2/2007 |
| DE | 102005055188 A1 | 5/2007 |
| DE | 102007020919 A1 | 11/2008 |
| DE | 102008019396 A1 | 10/2009 |
| EP | 2028052 A1 | 2/2009 |
| JP | H02113537 U | 9/1990 |

OTHER PUBLICATIONS

German Patent Office, German Patent Search Report for Application No. 102012012359.0, dated Jul. 25, 2012.

* cited by examiner

*Primary Examiner* — Michael McCullough
*Assistant Examiner* — Willie Berry, Jr.
(74) *Attorney, Agent, or Firm* — Lorenz & Kopf LLP

(57) ABSTRACT

A motor vehicle includes a seat arrangement, a cargo space situated behind the seat arrangement, an adjustable loading panel arranged inside the cargo space, guide rails located in the cargo space for the adjustable, laterally guided accommodation of the adjustable loading panel, and slide or roller bearings for mounting the adjustable loading panel in the guide rails. An actuating handle is mounted in the adjustable loading panel and movable through exposure to a spring action for swiveling an eccentric mounted in the adjustable loading panel out of a position that fixes the adjustable loading panel in place and into a position that releases the adjustable loading panel for adjustment purposes, and for adjusting the adjustable loading panel.

12 Claims, 3 Drawing Sheets

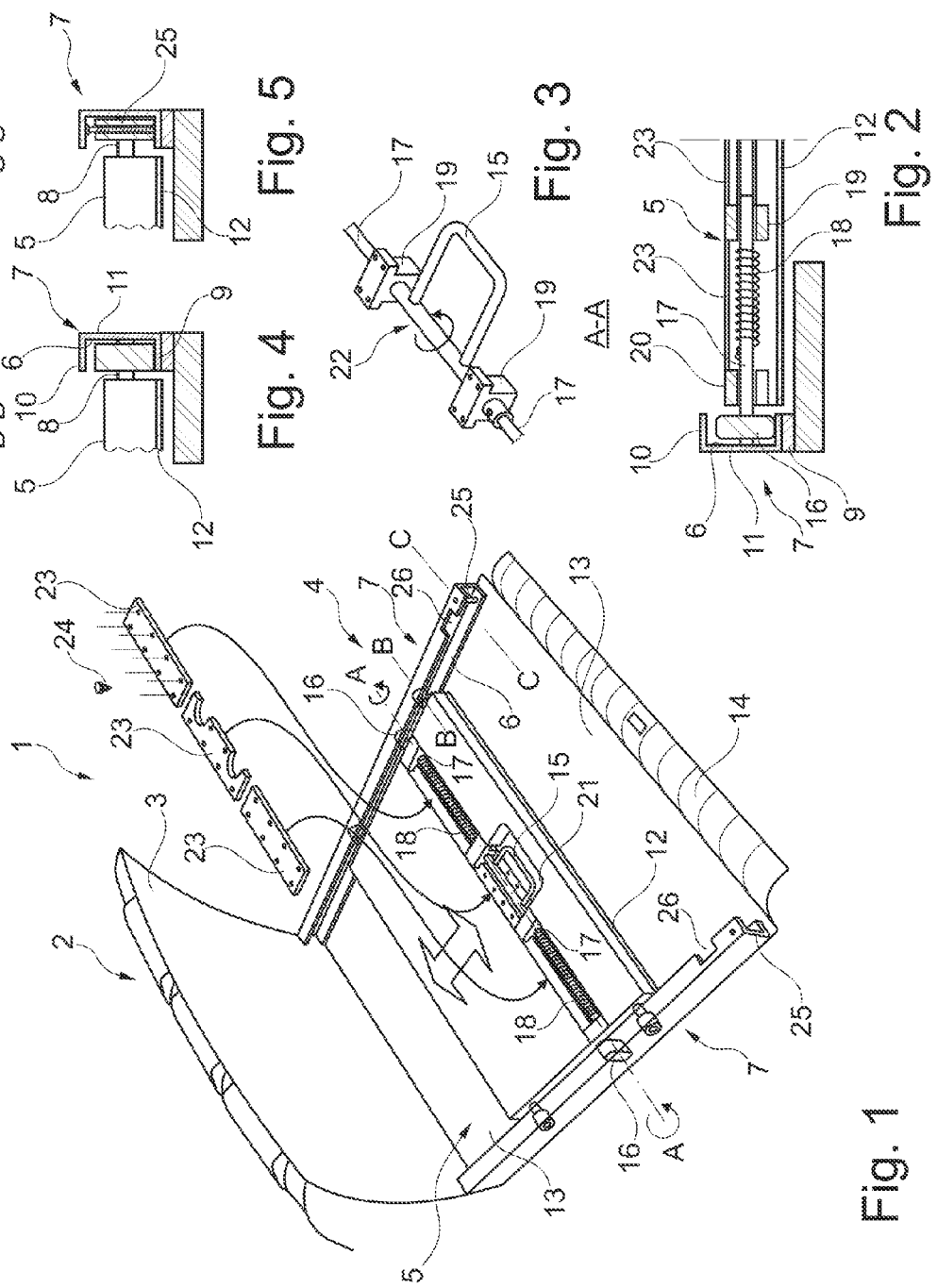

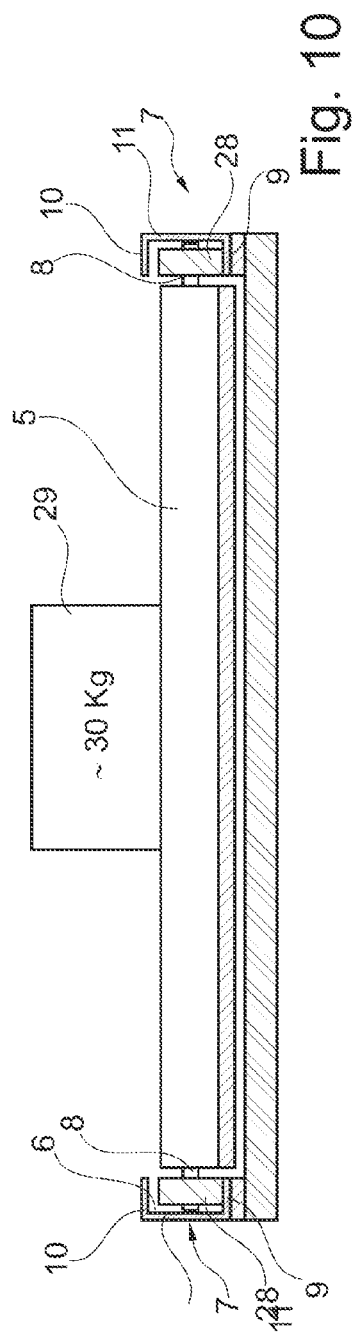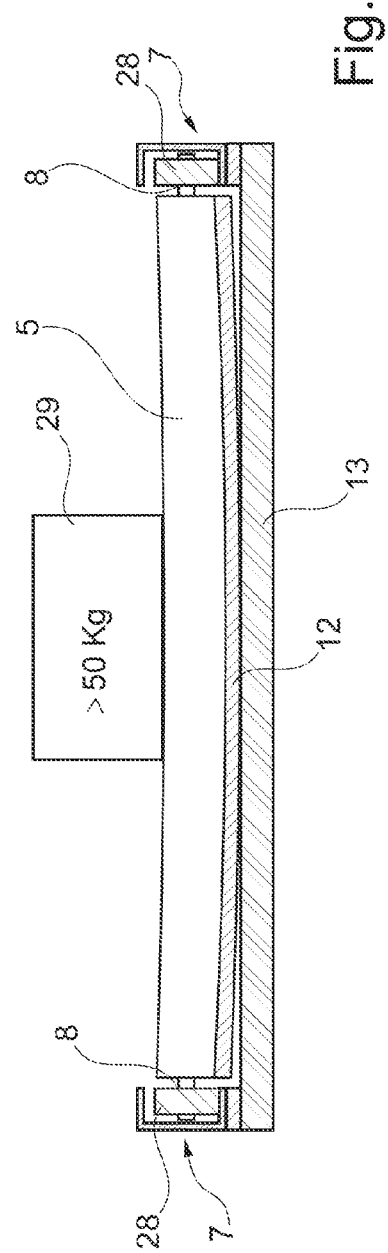

MOTOR VEHICLE WITH AN ADJUSTABLE LOADING PANEL IN A CARGO SPACE

CROSS-REFERENCE TO RELATED APPLICATION

This application claims priority to German Patent Application No. 10 2012 012 359.0, filed Jun. 22, 2012, which is incorporated herein by reference in its entirety.

TECHNICAL FIELD

The technical field relates to a motor vehicle with a cargo space situated behind a seat arrangement, and to an adjustable loading panel arranged inside the cargo space.

BACKGROUND

Known in the art are vehicles, in particular passenger cars, in which a cargo space is located behind a seat arrangement, inside of which is situated an adjustable loading panel. Involved here in particular are station wagons with a tailgate to be opened, making the cargo space accessible from the back. In order to be able to ergonomically load and unload the cargo space, the loading panel can be adjusted beyond the rear edge of the motor vehicle, so that loading and unloading can take place in this position. All that then still has to be done is to move the loaded or unloaded loading panel forward until it is completely inside the cargo space.

Known from DE 102 41 687 A1 is a motor vehicle with a cargo space situated behind a seat arrangement, and an adjustable loading panel arranged inside the cargo space. Both sides of the vehicle, meaning both sides of the cargo space, exhibit guides located therein for adjustably accommodating the loading panel, mounted on roller bearings. Locking bolts are used to lock the loading panel with guide rails in particular in the inserted position of the loading panel. The locking bolts can be unlocked through respective actuation with a Bowden cable. The respective Bowden cable is connected with an actuating handle integrated into the loading panel. The actuating handle converts a pivoting motion executed by the user into a pulling movement acting on the Bowden cables. After the locking bolt has been switched to its unlocked position, the loading panel can be moved in the guide rails. A spring action causes the actuating handle to swivel back when released, and the locking bolts exposed to the effect of the spring come into contact with the guide rails in the unlocked position. When the loading panel is adjusted, the spring action causes the locking bolts to latch with latching recesses in the guide rails once the loading panel has reached the retracted position. As a consequence, the loading panel is latched in relation to the guide rails only in this defined position or in prescribed, defined positions.

At least one object herein is to provide a motor vehicle that ensures an ergonomic loading of the cargo space with the continuous adjustment and automatic braking of the loading panel. In addition, other objects, desirable features and characteristics will become apparent from the subsequent summary and detailed description, and the appended claims, taken in conjunction with the accompanying drawings and this background.

SUMMARY

In a motor vehicle according to an exemplary embodiment, a cargo space is situated behind a seat arrangement, and a loading panel is adjusted inside the cargo space. The loading space integrates guide rails for the adjustable, laterally guided accommodation of the loading panel. The loading panel is mounted in the guide rails via slide or roller bearings. Further provided is an actuating handle, which is mounted in the loading panel, and movable through exposure to a spring action. It is used to swivel at least one eccentric mounted in the loading panel out of a position that fixes the loading panel in place into a position that releases the loading panel for adjustment purposes. The actuating handle is also used for adjusting the loading panel.

In an embodiment, the loading panel is laterally guided by means of lateral guide bolts, which simultaneously serve as a bearing shaft for the slide and/or roller bearings. This mount generates significantly less friction, thereby considerably reducing the operating/adjustment forces. For example, the mount consists of a plastic bearing bushing, a needle roller bearing or the like. The loading panel is preferably mounted in the guides front and back, on either side via the slide and/or roller bearings.

As a result, the configuration makes it possible to release the at least one eccentric from the position that fixes the loading panel in place when the actuating handle is activated through exposure to a spring action. As the user continues to grip the actuating handle and apply a force to the actuating handle in the adjustment direction of the loading panel, for example toward the rear, the loading panel can be adjusted. If the actuating handle is released, with the loading panel either stationary or moving, the eccentric exposed to the spring is switched into a position in which the eccentric fixes the loading panel in place. If the loading panel moves, this causes the loading panel to brake when the spring acts on the eccentric. By contrast, if the loading panel is not moved, the loading panel is fixed in this position when the spring acts on the eccentric.

As a consequence, the configuration of the motor vehicle makes it possible to adjust and automatically rake the loading panel.

In an embodiment, an abutment or support is formed for adjustably accommodating the loading panel through contact between a lower surface of the loading panel and a locating surface of a loading floor as the loading panel bends during exposure to a high load. If the loading panel is not exposed to any load or only to a load amounting to a specific maximum weight, the loading panel does not sag so as to come into contact with the loading floor. As a consequence, the loading panel is spaced apart from the loading floor, so that slight forces are enough to adjust the loading panel. Only starting at a specific weight or if the loading panel is loaded with a weight not provided for the intended use does deforming the loading panel yield a desired contact with the loading floor. This prevents the loading panel from being destroyed by a high load/excess load. The advantage to this quasi-elastic loading panel includes low costs and low weight. In addition, the loading panel is very robust. Since no surface friction can be discerned on any of the lower surface of the loading panel in normal instances, when the loading panel does not sag to such an extent that it touches the loading floor, a static charge is also avoided.

The loading panel can also be supported partially, for example via a small surface between the loading panel and loading floor.

In an embodiment, the actuating handle is used to swivel two eccentrics arranged on either side of the motor vehicle. This ensures that the eccentrics are effective on both sides of the loading panel, so that the loading panel can be decelerated or immobilized on either side of the loading panel.

For example, the eccentric is designed as a cam.

The respective eccentric, in an embodiment, exhibits a logarithmic characteristic. The logarithmic characteristic ensures that the wedge angle of the eccentric or cam remains constant at any swivel angle. As a result, the same braking power is always on hand regardless of tolerance.

An especially simple structural accommodation of the actuating handle and simple linkage of the actuating handle to the respective eccentric can be achieved by mounting the actuating handle in the loading panel so that it can swivel around an axis, and securing it in a torque-proof manner with the respective eccentric by way of a shaft. In an embodiment, the shaft passes through a coil spring or spiral spring, wherein the coil spring or spiral spring is joined with the shaft at one end, and with the loading panel at the other end. The respective eccentric or respective cam is exposed to the spring action of the swivel pin, thereby switching the eccentric or cam to the clamping position for fixing the loading panel in place relative to the guides accommodating the loading panel.

In another embodiment, the shaft is mounted in such a way as to accommodate it in the loading panel by means of a locating bearing in the area of the end facing the actuating handle, and by means of a floating bearing in the area of the end facing the eccentric. When using two eccentrics, two shafts are therefore provided, which are, for example, synchronized to each other at the actuating handle by means of a respective tolerance compensating device. The shafts on the right and left sides are thus decoupled when connected with the actuating handle.

In a final position with the spring preloaded, the actuating handle is swiveled into a recess on the upper side of the loading panel, in accordance with an embodiment. Due to the preloading, the spring generates the braking force. For example, each spring generates a torque of approx. 1 Nm. In particular, the spring has an extremely long overall length, which results in flat spring characteristics, so that the operating force rises insignificantly during actuation from a comfort standpoint. In the mentioned swiveled-in position, cargo can be moved on the loading panel without colliding with the actuating handle.

In an embodiment, the respective guide rail is designed in such a way as to exhibit a U-shaped profile. The U-shaped profile of the guide rail is open toward the other guide rail. The loading panel here exhibits guide bolts on either side, which ensure that the loading panel is precisely, laterally guided in the guide rails.

In an embodiment, the respective cam contacts the facing guide rail when positioned to fix the loading panel in place. As a consequence, the loading panel is fixed in place indirectly, i.e., via the cam(s) in the guide rail or guide rails.

In order to ensure that the loading panel is reliably secured in the guide rails, in an embodiment, when positioned to fix the loading panel in place, the respective cam contacts the facing guide rail exhibiting the U-shaped profile in the area of its upper and lower leg. The respective cam thus becomes clamped top and bottom on the allocated legs of the guide legs.

In another embodiment, the ends on one of the two guide rails, or as a general rule on both guide rails, exhibit stops that prevent an unintended withdrawal of the loading panel, i.e., out of the guide rails in the longitudinal extension of the motor vehicle. In order to disassemble the loading panel, these stops are removed, allowing the loading panel to be pulled further toward the rear. This makes it possible to adjust the cam position in alignment with a congruent window, in particular a section in the leg of the guide rail exhibiting the U-profile. In this position, the loading panel can either be withdrawn completely toward the back for disassembly, or swiveled around the front rotational axis, which is formed in particular by the front guide bolts, pushed forward toward the seatback of the rear row of seats, and there fixed into a inoperative position.

The configuration of the motor vehicle makes it possible to ergonomically load the cargo space by adjusting the loading panel. The components relating to the loading panel and its arrangement are inexpensive to manufacture, and only add slightly more weight.

The loading panel can be continuously adjusted and automatically decelerated. The loading panel and parts supporting the latter can be built into the motor vehicle after the fact. This is advantageous as an after-sales solution, and hence from an economic standpoint as well.

BRIEF DESCRIPTION OF THE DRAWINGS

The various embodiments will hereinafter be described in conjunction with the following drawing figures, wherein like numerals denote like elements, and wherein:

FIG. 1 is a perspective view of a cargo space area with an adjustable loading panel according to an exemplary embodiment;

FIG. 2 is a sectional view according to line A-A of FIG. 1 through the mounting area for the shaft, the spring acting on the shaft, and the eccentric connected with the shaft;

FIG. 3 is a perspective view of the mounting area of the actuating handle of FIG. 1;

FIG. 4 is a sectional view according to line B-B of FIG. 1 through the area of the guide bolt and the guide rail allocated thereto;

FIG. 5 is a sectional view according to line C-C of FIG. 1 through the area of the guide rail and the removable stop;

FIG. 10 is a cross-sectional view of the arrangement of loading panel and loading floor of FIG. 1 with the loading panel conventionally loaded; and FIG. 11 is cross-sectional view of the arrangement according to FIG. 10 with an excess load placed on the loading panel.

DETAILED DESCRIPTION

Figure 6:
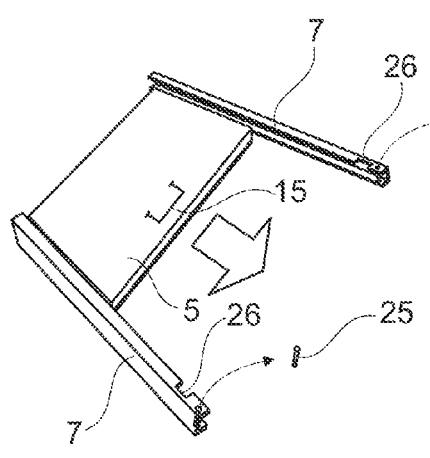
FIG. 6 is a perspective view of the arrangement of guide rails and loading panel of FIG. 1 with the loading panel pushed completely toward the front.

The following detailed description is merely exemplary in nature and is not intended to limit the invention or the application and uses of the invention. Furthermore, there is no intention to be bound by any theory presented in the preceding background of the invention or the following detailed description.

For a motor vehicle 1, FIG. 1 shows a cargo space 4 situated behind a rear seat arrangement 2, specifically its backrest 3, in accordance with an exemplary embodiment. Located within the cargo space 4 is an adjustable loading panel 5. The cargo space 4 incorporates lateral guides 6 for adjustably accommodating the loading panel 5 on either side of the motor vehicle 1 in relation to the longitudinal orientation or forward traveling direction of the motor vehicle. Two guide rails 7 are arranged parallel to each other and horizontally exhibit the guides 6. The respective guide rail 7 has a U-shaped profile, which is open toward the other guide rail 7. Both sides of the loading panel 5 exhibit guide bolts 8 front and back, meaning four guide bolts 8, which are guided in the two guide rails 7 and used to mount roller bearings and/or slide bearings 28. The respective guide rail 7 exhibits a lower leg 9, an upper leg 10 and a web 11 that joins the two legs. The roller bearings/slide bearings 28 contact the lower legs 9. The webs 11 of the guide rails 7 that exhibit the guides 6 are arranged parallel to each other.

The lower side of the loading panel 5 is flat, and exhibits a low-friction surface, illustrated by reference number 12. Situated under the loading panel 5 is a loading floor 13 of the cargo space 4. The loading floor 13 extends from the backrest 3 up to an end plate 14 that closes the cargo space 4 from the back.

In an embodiment, the motor vehicle 1 is a passenger car, for example a station wagon. In the locked state, the lockable tailgate is situated with its lower end adjacent to the end plate 14.

In another embodiment, the loading panel 5 incorporates an actuating handle 15 that can be moved through exposure to a spring action, for example in the rear, central area of the loading panel 5. This actuating handle 15 is used to swivel two eccentrics 16 indirectly mounted in the loading panel 5, which are designed as cams. The respective eccentric exhibits a logarithmic characteristic.

The actuating handle 15 can be used to swivel the two eccentrics 16 from a position that fixes the loading panel 5 in place relative to the two guide rails 7 into a position that releases the loading panel for adjustment purposes, wherein the loading panel 5 can be adjusted with the actuating handle 15 in this position. This, for example, takes place with the actuating handle 15 by having a person standing behind the end plate 14 pull it back.

In an embodiment, the actuating handle 15 is mounted in the loading panel 5 so that it can swivel around the axis A-A depicted on FIG. 1, and joined with the respective eccentric 16 by a shaft 17. The respective shaft 17 here passes through a coil spring 18, whose one end is connected with the shaft 17, and whose other end is joined with the bearing 19 for the shaft 17 allocated to the loading panel 5, as may be gleaned from FIG. 2. Specifically, the respective shaft 17 is mounted in the loading panel 5 in the area of the end facing the actuating handle 15 by means of a locating bearing 19, and in the loading panel 5 in the area of the end facing the eccentric 16 by means of a floating bearing 20, which releases the shaft 17 in the Z-direction.

In the area of the actuating handle 15, the loading panel 5 is provided with a recess 21 in the area of its upper side, in an embodiment. In a final position with the coil spring 8 preloaded, the actuating handle 15 is swiveled into this recess 21. The two shafts 17 are synchronized to each other on the actuating handle 15 by a tolerance compensating device 22. The latter decouples the shafts 17 on the left and right side, and ensures that full use is made of the two eccentrics 16.

In the area of the tolerance compensating device 22 and the area of the two coil springs 18, hollow spaces for accommodating the corresponding functional parts are covered by cover plates 23. The latter are depicted on FIG. 1 prior to their assembly. The cover plates 23 are secured by means of screws 24.

In an exemplary embodiment, if the actuating handle 15 is not gripped, it is acted upon by the coil springs 18, which swivel it into its mentioned final position, in which the actuating handle 15 is swiveled into the recess 21. During exposure to the two springs 18, the two shafts 17 along with the allocated eccentrics 16 are swiveled in such a way that the respective eccentric 16 abuts against both the lower leg 9 and upper leg 10 of the allocated guide rail 7 with the spring acting as a swivel pin spring preloaded, as evident from FIG. 2. As a result, the eccentric 16 becomes clamped in relation to the guide rail 7, so that the loading panel 5 cannot be adjusted in the guide rails 7.

In a further embodiment, in order to release this fixed position of the loading panel 5, the actuating handle 15 is gripped, for example starting in the position depicted on FIG. 1, and swiveled out of the recess 21 against the allocated cover plate 23. The rotational motion of the actuating handle 15 is transmitted to the shafts 17, correspondingly swiveling the eccentrics 16 out of contact with the legs 9 and 10 of the allocated guide rail 7. During this swiveling motion of the actuating handle 15, the two coil springs 18 are preloaded more strongly. If a force in the direction of the end plate 14 is exerted on the actuating handle 15 in this swiveling position, it causes the loading panel 5 to be pulled in the direction of the end plate 14. If the actuating handle 15 is released during this travel by the loading panel 5, the preloaded coil springs 18 cause the eccentrics 16 to independently switch into their fixed position according to FIG. 2 in relation to the two guide rails 7. This directly interrupts the traveling motion of the loading panel 5, and thus brakes the loading panel 5.

The loading panel 5 can be displaced in the direction of the backrest 3 in the same way.

As illustrated on FIG. 5, in an embodiment, a bolt 25 is inserted into mutually aligned boreholes in the legs 9 and 10 in the rear area of the respective guide rail 7, and represents a removable stop for the rear roller bearings/slide bearings 28 of the loading panel 5 during rearward movement. Further, the upper leg 10 of the respective guide rail 7 exhibits a recess 26 open toward the other guide rail 7 at the same distance to the rear end of the guide rails 7. The latter is provided for passage by the eccentric 16 upwardly out of the guide rails 7.

Figure 7:
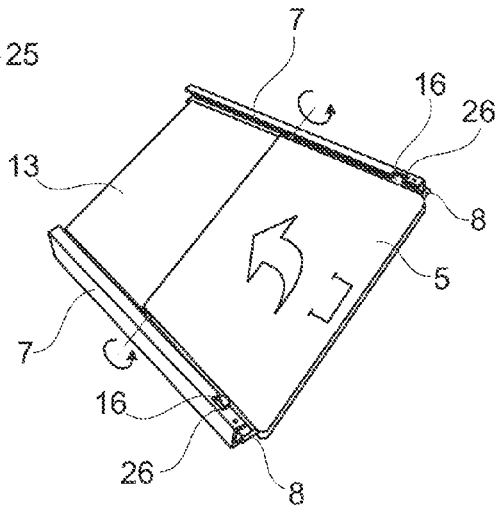
FIG. 7 is a perspective view of the arrangement according to FIG. 6 with the rear stops removed, and the loading panel slightly extended over the rear end of the guide rails.
Figure 8:
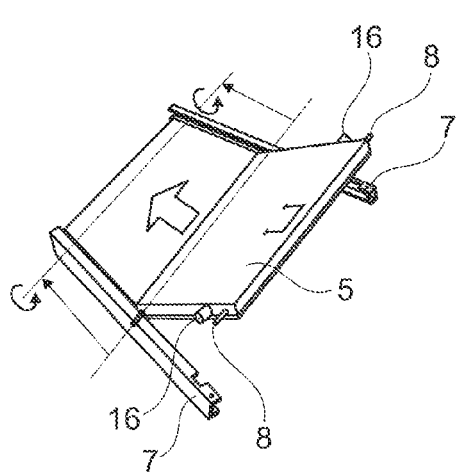
FIG. 8 is a perspective view proceeding from the state according to FIG. 7, with the bearing panel swiveled up and toward the back around its front guide bolt.
Figure 9:
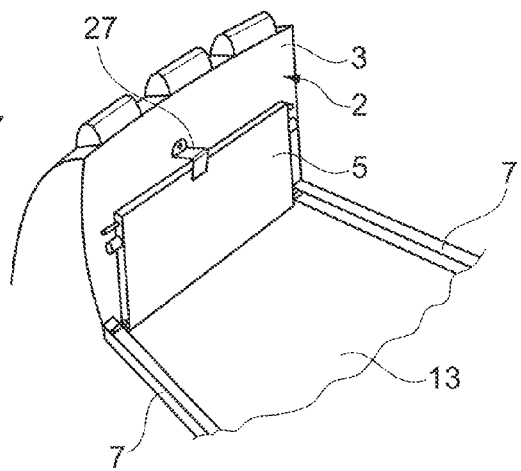
FIG. 9 is a perspective view proceeding from the depiction according to FIG. 8, with the loading panel moved toward the front, which is swiveled against the rear wall of the backrest of the rear seat arrangement.

FIG. 6 illustrates the arrangement of the two guide rails 7 and loading panel 5 with the loading panel 5 pushed maximally toward the front, so that it is arranged adjacent to the backrest 3 of the seat arrangement 2 in this position. As depicted on FIG. 6, once the two bolts 25 have been removed, the loading panel 5 can be displaced in the rearward direction toward the rear end of the guide rails 7 after the actuating handle 15 has been activated and a tensile force has been applied to the latter, specifically until the two rear roller bearings/slide bearings 28 exit the guide rails 7 and the two eccentrics 16 are arranged under the recesses 26. This is illustrated on FIG. 7, but without the roller bearings/slide bearings 28. Proceeding from this state, the loading panel 5 can be swiveled around the two front guide bolts 8, which are mounted in the guide rails 7, thereby lifting the rear end of the loading panel 5. This state is shown on FIG. 8, again without the roller bearings/slide bearings 28. Proceeding from the latter, the loading panel 5 that continues to be guided via the front guide bolts 8 in the guide rails 7 can be displaced toward the front up until the backrest 3, and the loading panel 5 can then be flatly swiveled against the backrest 3. In this position, the loading panel 5 can be held against the backrest 3 by a retaining strap 27 as illustrated on FIG. 9, wherein the roller bearings/slide bearings 28 are again not depicted.

The bolts 25 are usually not removed, so that they limit the rearward movement of the loading panel 5.

FIG. 10 illustrates the arrangement of the loading panel 5 and loading floor 13 when the loading panel 5 is exposed to an intended load 29, for example of roughly 30 kg. At this load, no relevant sagging can be discerned on the part of the loading panel 5, which is spaced apart from the loading floor 13 both when exposed to no load or to the load specified above. As a consequence, the loading panel 5 can be freely adjusted relative to the loading floor 13.

FIG. 11 clarifies the situation in which a distinctly higher load 29 is placed on the loading panel 5. For example, this load exceeds 50 kg. This high load causes the loading panel 8 to downwardly sag, specifically to such an extent that the loading panel 5 abuts against the loading floor 13.

As further clarified on FIGS. 10 and 11, in an embodiment the guide rails 7 are mounted in the loading floor 13.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A motor vehicle comprising:
   a seat arrangement;
   a cargo space situated behind the seat arrangement;
   an adjustable loading panel arranged inside the cargo space;
   guide rails located in the cargo space for the adjustable, laterally guided accommodation of the adjustable loading panel;
   slide and/or roller bearings for mounting the adjustable loading panel in the guide rails;
   an actuating handle mounted in the adjustable loading panel and movable through exposure to a spring action for swiveling an eccentric mounted in the adjustable loading panel out of a position that fixes the adjustable loading panel in place and into a position that releases the adjustable loading panel for adjustment purposes, and for adjusting the adjustable loading panel, wherein the actuating handle is swivelable into a recess on an upper side of the adjustable loading panel in a final position with a preloaded spring, and
   wherein the actuating handle is used to swivel two eccentrics arranged on either side of the motor vehicle.

2. The motor vehicle according to claim 1, wherein the adjustable loading panel is mounted in the guide rails via the slide and/or roller bearings.

3. The motor vehicle according to claim 1, wherein an additional abutment or support for adjustably accommodating the adjustable loading panel is formed through contact between a lower surface of the adjustable loading panel and a locating surface of a loading floor as the adjustable loading panel bends during exposure to a high load.

4. The motor vehicle according to claim 1, wherein one of the eccentrics exhibits a logarithmic characteristic.

5. The motor vehicle according to claim 1, wherein the actuating handle is mounted in the adjustable loading panel so that it is swivable around an axis, and is secured in a torque-proof manner with one of the eccentrics by way of shafts, wherein the shafts are synchronized to each other by a tolerance compensating device.

6. The motor vehicle according to claim 5, wherein at least one of the shafts passes through a coil spring or spiral spring, wherein the coil spring or spiral spring is connected at a first end with the at least one of the shafts and joined at a second end with the adjustable loading panel.

7. The motor vehicle according to claim 5, wherein at least one of the shafts is mounted in the adjustable loading panel in an area of an end facing the actuating handle by a locating bearing, and in the adjustable loading panel in an area of an end facing one of the eccentrics by a floating bearing.

8. The motor vehicle according to claim 1, wherein one of the guide rails comprises a U-shaped profile that is open toward another of the guide rails, wherein the adjustable loading panel comprises guide bolts on either of its sides, which incorporate the slide or roller bearings, and the guide bolts are guided in the guide rails.

9. The motor vehicle according to claim 1, wherein one of the eccentrics, when positioned to fix the adjustable loading panel in place, contacts one of the guide rails.

10. The motor vehicle according to claim 9, wherein one of the eccentrics, when positioned to fix the adjustable loading panel in place, contacts the one of the guide rails comprising a U-shaped profile in an area of an upper and a lower leg of the one of the guide rails.

11. The motor vehicle according to claim 1, wherein at least one of the guide rails comprises a removable stop for the adjustable loading panel or for one of the slide or roller bearings of the loading panel in an area of an end facing away from the seat arrangement, and the one of the guide rails comprises a recess for passage of one of the eccentrics in the area of the end facing away from the seat arrangement.

12. The motor vehicle according to claim 11, wherein the one of the guide rails comprises the recess for passage of one of the eccentrics in front of the removable stop.

* * * * *